United States Patent
Feng et al.

(12)

(10) Patent No.: US 6,317,284 B1
(45) Date of Patent: Nov. 13, 2001

(54) HEAD NUDGE AND PARK PEAK CURRENT SUPPRESSION

(75) Inventors: Dai Feng, San Diego; Daniel Alfonsi, Ramona, both of CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/183,592

(22) Filed: Oct. 30, 1998

(51) Int. Cl.[7] .................................................. G11B 21/02
(52) U.S. Cl. ................... 360/75; 360/46; 360/69
(58) Field of Search ...................... 360/75, 78.04, 360/69, 46

(56) References Cited

U.S. PATENT DOCUMENTS

| 5,384,675 | 1/1995 | Crawforth et al. ............ 360/75 |
| 5,402,200 | * 3/1995 | Shrinkle et al. ............ 360/69 |
| 5,615,064 | 3/1997 | Blank et al. ............ 360/75 |
| 5,663,846 | * 9/1997 | Masuoka et al. ............ 360/75 |

FOREIGN PATENT DOCUMENTS 0 185 579 A1   6/1986   (EP) .

OTHER PUBLICATIONS

U.S. application No. 09/183,903, Feng, filed Oct. 10, 1998

* cited by examiner

*Primary Examiner*—David Hudspeth
*Assistant Examiner*—Dan I. Davidson
(74) *Attorney, Agent, or Firm*—Woodcock Washburn Kurtz Mackiewicz & Norris LLP (57) ABSTRACT

A head loading and parking apparatus for a disk drive device is disclosed that is characterized by varying a voice coil current and voltage during a head loading process. The varying voltage nudges read-write heads off of a load ramp and onto the surface of a data storage medium. Peak power is controlled by selectively turning off portions of the electronic system.

12 Claims, 8 Drawing Sheets

Table 1

| Read Channel ASIC at 5 Volts | Active Mode | Idle Mode | Standby Mode | Sleep Mode |
|---|---|---|---|---|
| Average | 650 mA | 400 mA | 70 mA | 10 mA |
| Peak | 850 mA for 360 ms | | | |
| Power Dissipation | 2W | 1.32W | 235 mW | 33 mW |

| Read Channel ASIC at 3.3 Volts | Active Mode | Idle Mode | Standby Mode | Sleep Mode |
|---|---|---|---|---|
| Average | 450 mA | 300 mA | 70 mA | 10 mA |
| Peak | 650 mA for 360 ms | | | |
| Power Dissipation | 1.5 W | 1 W | 235 mW | 33 mW |

HEAD NUDGE AND PARK PEAK CURRENT SUPPRESSION

BACKGROUND OF THE INVENTION

This invention is directed to a disk drive device; more specifically, it is directed to a device for loading disk drive read-write heads onto a medium.

Over many years, a variety of devices that read and write information on a rotating disk medium have been developed and used as computer data storage devices. Of these devices, magnetic medium devices have been and still are among the most common computer storage devices. Widely used magnetic disk drive devices are generally available in two broad categories-removable and fixed. In particular, removable cartridge disk drives read and write information magnetically on a disk that is enclosed in a removable protective case. By contrast, fixed disk drives read and write information magnetically on a fixed disk that is permanently fixed in the data storage device.

Fixed disk drives are used as the principal data storage devices of computers, since they typically have data transmission speeds and storage capacities that are several orders of magnitude greater than removable disk drives. Obviously however, fixed disk drives have the drawback, as compared with removable disk drives, that the disk cannot be easily moved to another computer. As a result, it is ordinarily desirable to provide computers with both a removable disk drive along with a fixed disk drive and most desktop computers have both.

In recent years, however, mobile computers of very small sizes, such as handheld, notebook and lap-top computers, have become widely used. Because space in these computers is a premium, removable cartridge disk drives are attached externally or not at all. Furthermore, in such small computers, external removable cartridge drives are very inconvenient for mobile use. Hence, many of these types of computers do not have disk drives, but rather use IC card based storage media via a PCMCIA port on the computer. However, since IC cards use semiconductor memories, storage capacities are small, and costs are high. These drawbacks have made it difficult for such computers to use programs and data that have large storage requirements.

In response to the widespread use of small size mobile computers, smaller disk drives have been and are under development. Such drives present many development challenges including size and power constraints. The storage density is high and the components, smaller and potentially more delicate, are susceptible to damage. Moreover, small portable drives are likely to be battery powered and may share that battery power with a primary device such as a hand held computer.

Loading the heads onto the surface of the data storage medium is a critical part of the design of magnetic storage medium. Typically, the heads and the medium surface in magnetic storage devices are highly susceptible to damage. For example, small amounts of debris have been known to render drives and medium useless. Similarly, loading the heads onto the medium surface has the potential to damage the heads, the medium, or both. Moreover, loading the heads in small, high capacity device must also meet power and size constraints without causing damage to the drive or storage medium.

Therefore, there is a need to provide a head loading apparatus for disk drive device. Particularly, a disk drive device that is small and portable.

SUMMARY OF THE INVENTION

In order to meet the aforementioned need, this invention provides a disk drive device having a magnetic medium. The disk drive device comprised an actuator coupled to the disk drive; a read-write head in mechanical communication with the actuator. The actuator moves the head over the medium in response to an electrical signal. The disk drive device also comprises a head load ramp, for maintaining the read-write head when it is in a parked position on the load ramp; data reading means in electrical communication with the read-write head for reading data from the medium by way of the read-write head; and control means in electrical communication with the data reading means and the actuator. The control means apply the electrical signal to the actuator for moving said heads between the parked position and the medium. The control means controls power to the data reading means such that the data reading means is changed to a low power state during the movement of the head between the parked position and the medium.

Preferably, the electrical signal applied to the actuator for moving the head between the parked position and the medium comprises a plurality of electrical pulses. Additionally, the low power state comprises a state wherein power is disconnected from a portion of the data reading means. Preferably, moving the data reading means to a low power state comprises placing a read channel circuit into a low or no power state.

BRIEF DESCRIPTION OF THE DRAWING

The foregoing summary, as well as the following detailed description of the preferred embodiments, are better understood when they are read in conjunction with the appended drawings. The drawings illustrate preferred embodiments of the invention to illustrate aspects of the invention. However, the invention should not be considered to be limited to the specific embodiments that are illustrated and disclosed. In the drawings.

DETAILED DESCRIPTION OF PREFERRED EMBODIMENTS

The invention provides a head loading apparatus for a disk drive. Throughout the description, the invention is described in connection with a removable media disk drive, and the drive is shown having a rotary actuator. However, the particular disk drive and cartridge shown only illustrate the operation of the present invention and are not intended as limitations. The invention is equally applicable to other disk drives including linear actuator disk drives, fixed medium drives, and removable medium disk drives that accept differently sized and shaped cartridges. Accordingly, the invention should not be limited to the particular drive or cartridge embodiment shown as the invention contemplates the application to other drive and cartridge types and configurations.

Figure 1:
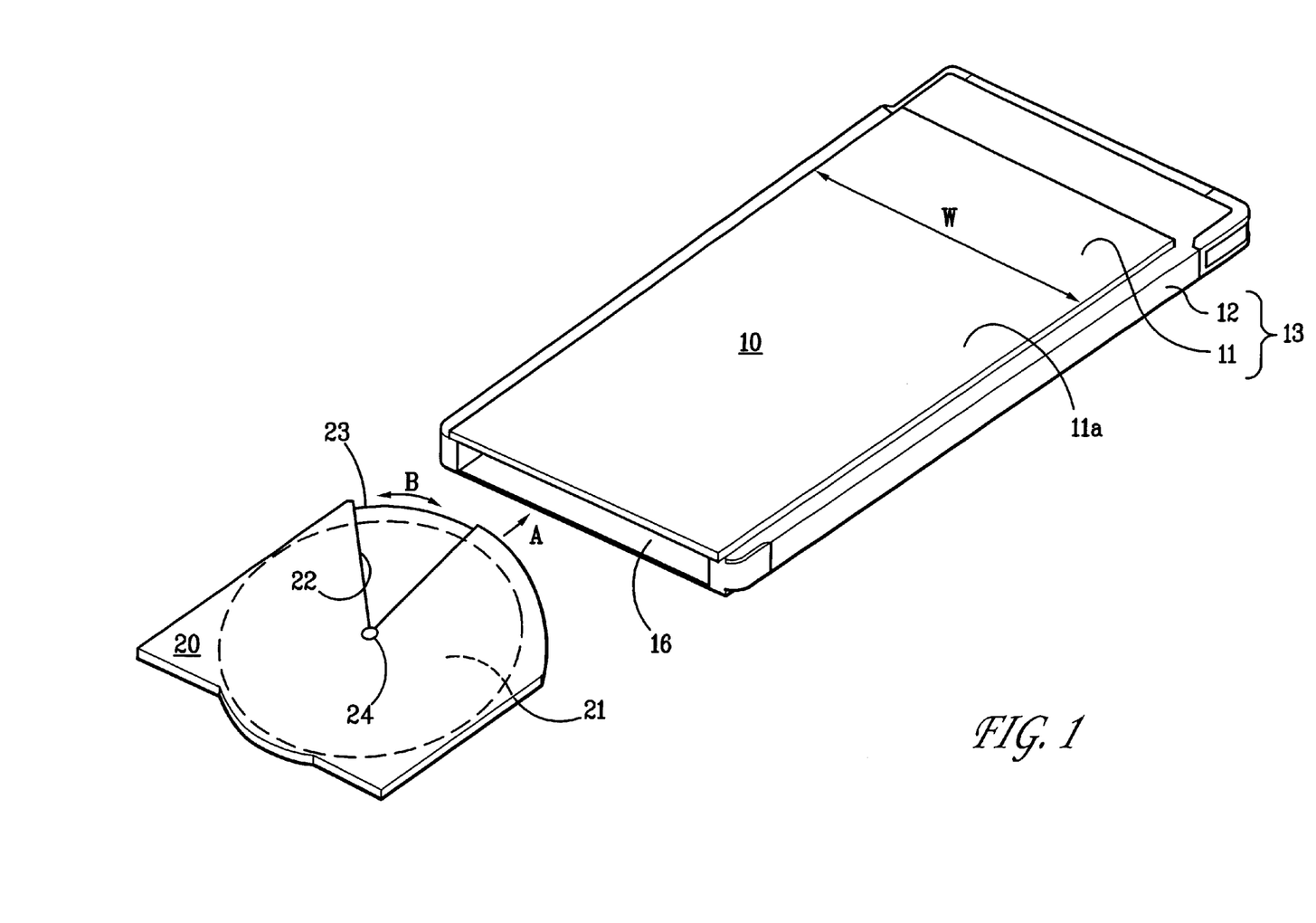
FIG. 1 is a perspective view of a disk drive device and a disk cartridge of this invention.

FIG. 1 is a perspective drawing of a disk drive device 10 and a disk cartridge 20. Drive 10 may be adapted for removable connection to a computer device of may be built-in to a computer device. Preferably, disk drive device 10 has a form factor such that it may be adapted for use with a PCMCIA connection (Type III or, more preferably, Type II). Disk drive device 10 may have a protective case such as protective case 13, consisting of an upper case 11 and a lower case 12, which form an interior space for accepting disk cartridge 20. Upper case 11 and lower case 12 are formed from sheet material. Lower case 12 has a bottom surface and side surfaces, and upper case 11 is formed so that it covers the top of lower case 12. Upper case 11 has a raised surface 11a, which projects upward across a width W of the upper case 11. Width W of this raised surface 11a is between about 48 mm and 51 mm. Accordingly, space is available within case 13 to accommodate a disk cartridge 20 as well as a disk drive mechanism and an electronics system.

A connector 15 (shown in phantom in FIG. 1) is provided in one end of protective case 13. As noted, the external dimensions of the protective case 13 are in a form which conforms to the PCMCIA standards, preferably Type II. According the standard, the form factor should conform to a length of about 85.6 mm, a width of about 54 mm, and a thickness of about 5 mm. By conforming to this standard, drive device 10 can be adapted for insertion into a PCMCIA port, such as the type commonly found in computers (not shown). Furthermore, when disk drive device 10 is inserted into a PCMCIA port of a computer or built-in to a computer device, connector 15 connects to a corresponding connector within the computer such that a power source and electrical signals can be transmitted and received between disk drive device 10 and the computer.

Disk cartridge 20 comprises an outer shell in which a flexible disk medium 21 is rotatably disposed. A disk access opening 22 is formed in a front portion of disk cartridge 20 to provide access to flexible disk medium 21. A shutter 23 is rotatably disposed in cartridge 20 to selectively cover and expose disk access opening 22. Shutter 23 rotates in a circumferential direction (arrow B) with the center of rotation 24 proximate the center of flexible disk 21. Disk cartridge 20 is inserted into disk drive device 10 through a disk opening 16 (arrow A). During insertion, shutter 23 is opened by a shutter opening and closing mechanism (not shown) exposing flexible disk medium 21 for access by a pair of read/write heads, discussed in further detail below.

Figure 2:
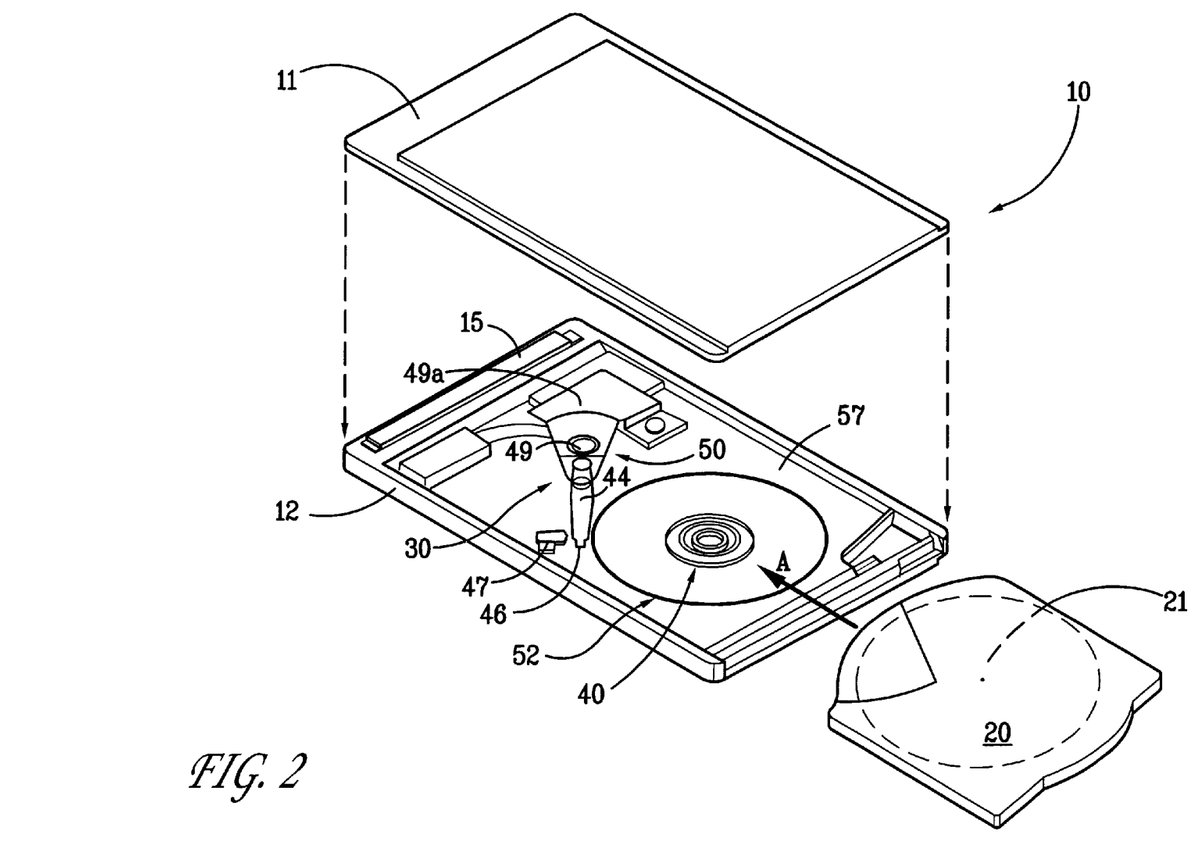
FIG. 2 is an exploded perspective view of the disk drive device of FIG. 1.

FIG. 2 illustrates the internal structure of the disk drive device 10. A chassis 57 is disposed in protective case 13. A control circuit board (not shown), containing the disk drive electronics, is connected underneath chassis 57. Connector 15 is fixed to the control circuit board by conventional means such as soldering a lead terminal of connector 15 to the circuit board. A spindle motor 52, which comprises a chuck platform 40, is coupled to chassis 57. A head arm assembly 30 and a load ramp 47 are also attached to chassis 57. Head arm assembly 30 comprises two load beams 44 and a rotary actuator 50. Rotary actuator 50 comprises a rotating shaft 49 and a rotary actuated voice coil motor 49a. Voice coil motor 49a is formed on head arm assembly 30 opposite load beams 44. In combination with a magnet (not shown) voice coil 49a constitutes a voice coil motor for rotating head arm assembly 30 over flexible disk medium 21 during drive 10 operation. A magnetic read-write head 46 is fixed to the end of each of the two load beams 44.

When the disk cartridge 20 is inserted into disk drive device 10, flexible disk medium 21 couples with chuck platform 40 which is provided on spindle motor 52 and accordingly rotates together with the rotation of spindle motor 52. Head arm assembly 30 retracts onto load ramp 47 during insertion or ejection of disk cartridge 20. Head arm assembly 30 loads read-write heads 46 (i.e., moves them off of load ramp 47 and onto flexible disk 21) after cartridge 10 is inserted and flexible disk medium 21 is rotating at an operational speed.

Figure 3:
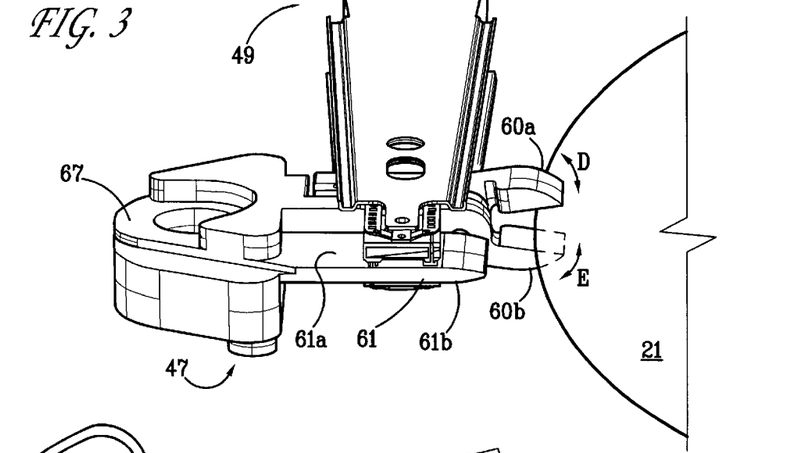
FIG. 3 is an isometric view of a head arm assembly of the disk drive of FIG. 1 in a parked position.
Figure 4:
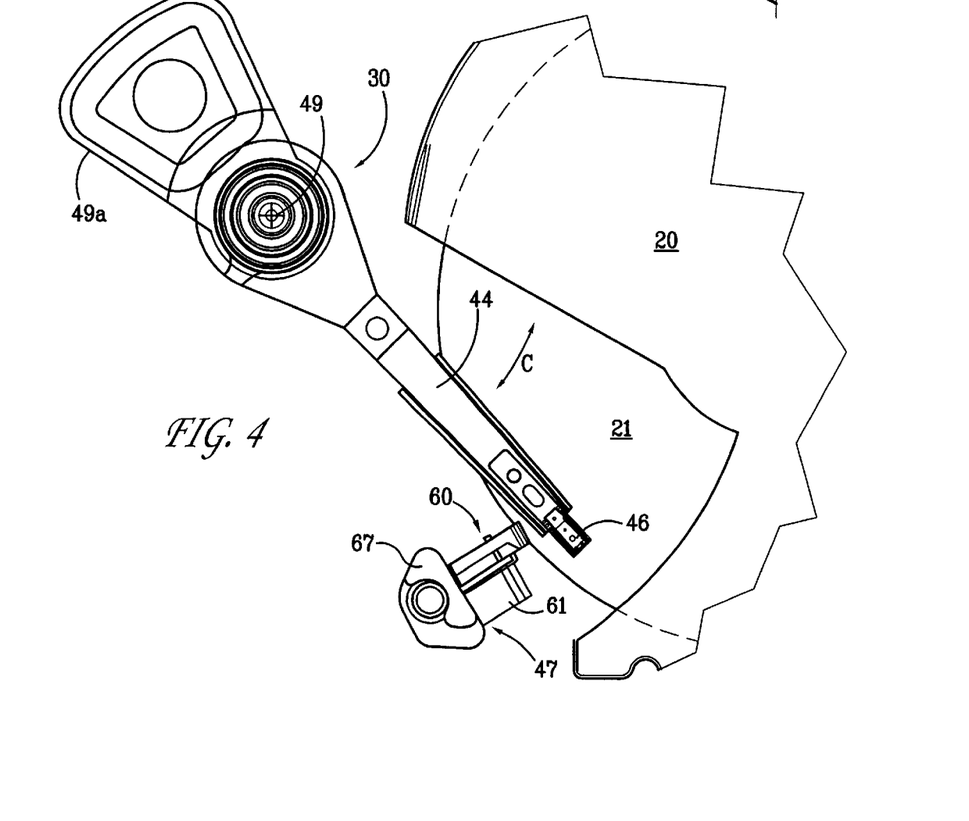
FIG. 4 is a top plan view of a head arm assembly of the disk drive of FIG. 1 in a loaded position.

FIGS. 3 and 4 illustrate the movement of head arm assembly 30 on and off of load ramp 47 between a first, parked position and a second, loaded position. Load ramp 47 is shown for exemplary purposes only as the invention is equally applicable to a variety of load ramp designs. FIG. 3 shows an isometric view of head arm assembly 30 in the parked position on load ramp 47 and provides further details of load ramp 47. By contrast, FIG. 4 illustrates a load position, wherein head arm assembly 30 is free to move read-write heads 46 over the surface of flexible disk medium 21.

Load ramp 47 comprises a base 67, head guard 61, pivoting arms 60a and 60b, pivot pin (not shown), and a compression spring (not shown). Each arms 60 comprises a ramped end portion and a tail portion. Pivoting arms 60a and 60b are arranged to pivot about the pivot pin in opposing fashion. Pivoting arm 60a pivots as indicated by arrow D and pivoting arm 60b pivots as indicated by arrow E. Together, pivoting arms 60a, 60b pivot between an open position, in which the ramped ends of pivoting arms 60a, 60b pivot away from each other, and a closed position in which the ramped ends pivot toward each other. A spring (not shown) is disposed between the arms 60a and 60b such that the arms 60a and 60b are biased toward the closed position. Head guard 61 extends out from the base 67 and provides opposing surfaces 61a and 61b. Each surface 61a and 61b has a ramped front portion. Each of surfaces 61a and 61b provides a surface for heads 46 to rest when the head arm assembly 30 is in the parked position.

In the parked position, load arms 44 provide a clamping force on the arms 60a and 60b of load ramp 47. This clamping force compresses the spring (not shown) and opens the ramped ends of arms 61a and 61b. Disk drive 10 can accept or eject a cartridge 20 when load beams 44 are in the parked position. Moreover, with arms 60a and 60b of load ramp 47 open, flexible disk 21 can fluctuate between the ramped ends of arms 60a, 60b during insertion. In the parked position, heads 46 rest on head guard surfaces 61a and 61b. These surfaces 61 restrict the movement of heads 46. As a result, opposing heads 46 cannot contact and cause damage in cases of shock or vibration. After cartridge 20 is inserted and medium 21 is fully loaded within drive 10, head arm assembly 30 is free to move over medium 21 reading and writing data.

In FIG. 4, head arm assembly 30 is shown in an loaded position, after moving off of load ramp 47. As load beams 44 move from the parked position over pivot arms 60a and 60b toward the ramped ends, the bias that load beams 44 place on the spring is relieved. As a result, the ramped ends close toward the medium 21 providing a ramped surface for load beams 44 to slide down onto medium 44. Eventually, head arm assembly 30 moves the heads 46 via load beams 44 onto medium 21. All the while, load ramp 47 does not pivot in the plane of the media but remains fixed. Load ramp 47 remain in the closed position until heads 46 are again parked.

The parking of heads 46 operates in the reverse of the above described head loading. In such an instance, heads 46 move toward load ramp 47. Eventually, load beams 44 engage and slide up the closed ramped ends. When load beams 44 cross over the arms 60a and 60b proximate their pivot point, load beams 44 begin to compress the bias spring. The compression of the spring and the movement of load beams 44 causes arms 60a and 60b to pivot toward the open position. With the ramped end portions thus open, medium 21 is free to fluctuate as it ejects from drive 10.

Figure 5:
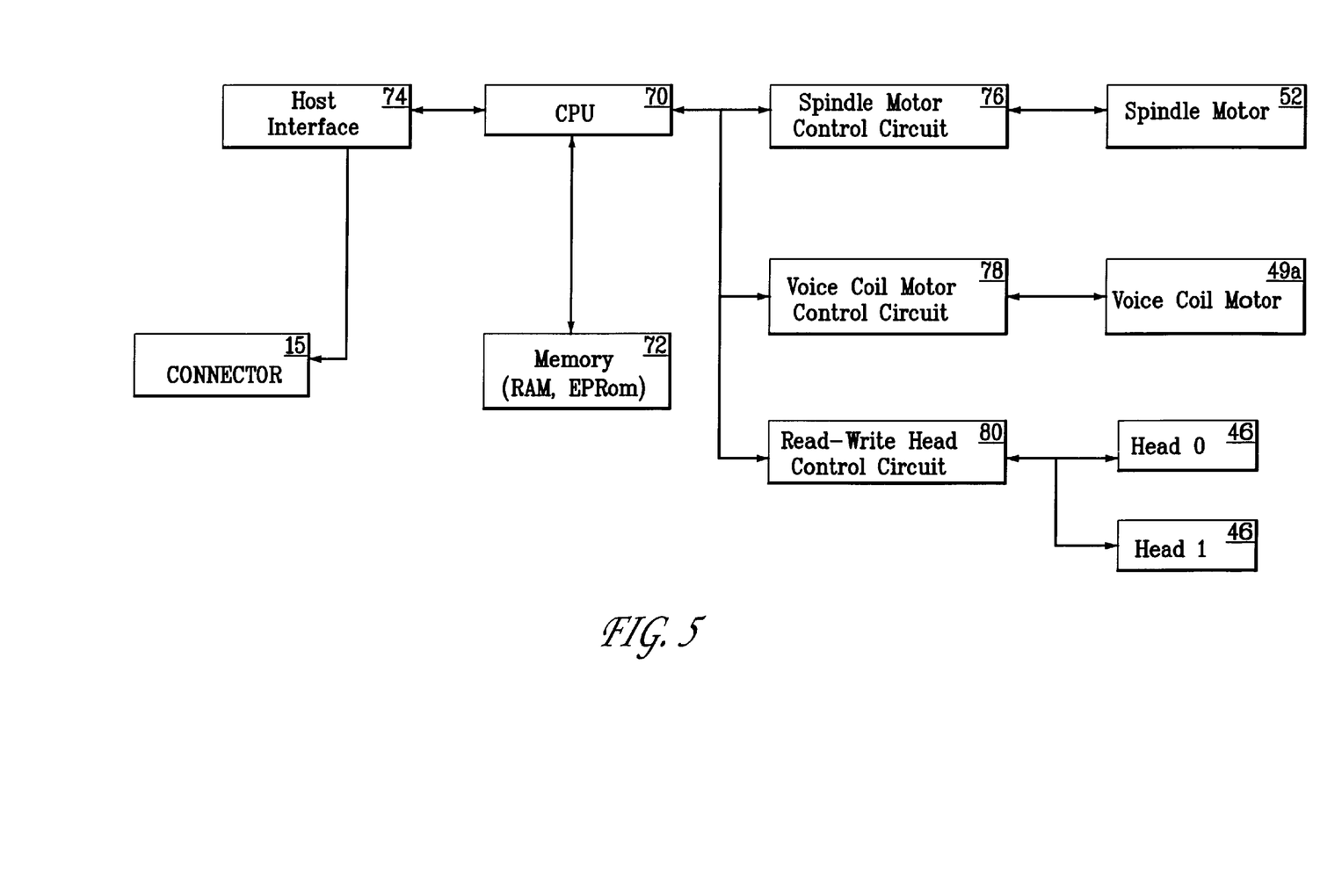
FIG. 5 is a block diagram of the electronics system of the disk drive of FIG. 1.

FIG. 5 is a block diagram of the electronics system of drive 10. The electronics system controls the movement of head arm assembly 30 via voice coil motor 49a, the reading and writing to medium 21 via heads 46, and the spinning of the flexible medium to an operational speed via spindle motor 52. The electronics system comprises a main CPU 70, memory 72, a host interface 74, a spindle motor control circuit 76, a voice coil motor control circuit 78, and a read-write head control circuit 80. Memory 72 contains a set of programs and data that control various operations of the electronic system. In particular, memory 72 contains programs for controlling the operation of head loading and head parking from medium 21. The head loading and parking programs, as well as other programs vital to the operation of drive 10 stored in memory 72, are executed on CPU 70, which in turn uses the programs to control and monitor the operation of the various electronic subsystems components—control circuits 76, 78, and 80. As described more fully below, the subsystem components directly control electro-mechanical drive components.

Figure 8:
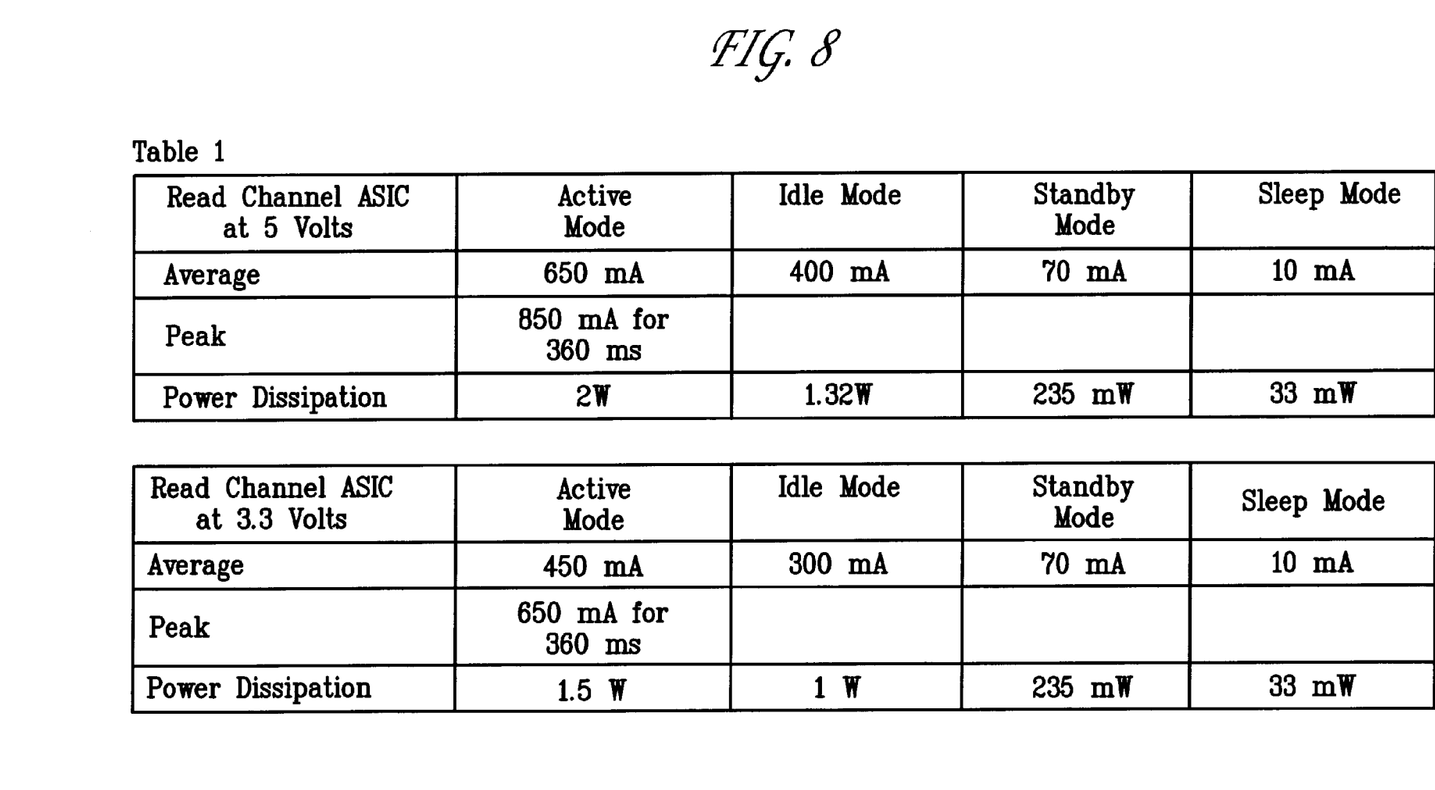
FIG. 8 is a table of the power modes of a read channel integrated circuit employed in the electronics system of FIG. 5.

Spindle motor control circuit 76 is electrically coupled to spindle motor 52. As such, control circuit 76 controls the power to spindle motor 52 as needed to maintain the proper rotational speed. Voice coil motor control circuit 78 is electrically coupled to voice coil motor 49a. By providing voltage and current to voice coil motor 49a, control circuit 78 controls, head loading, head parking, and the rotation of head arm assembly 30 over medium 21. Read-write head control circuit 80 controls the operation of heads 46. By supplying a voltage signal to heads 46 data is written to medium 21. By reading the voltage from heads 46 data is read from medium 21. Preferably, read-write heads control circuit 80 comprises a read channel integrated circuit such as a Texas Instruments Read Channel with Adaptive Threshold Qualifier (part no SSI 34P3410). The read channel integrated circuit can operate at about 3.3 volts or about 5 volts. The read channel integrated circuit has four power modes (Active, Idle, Standby, and Sleep) that consume varying amounts of power. FIG. 8 provides the power consumption information for each mode. Of course, power consumption of the read channel integrated circuit will drop to zero if the power to the circuit is turned off.

During head loading and head parking, all of the components of the electronic system cooperate to ensure a proper operation. Medium 21 must be spinning at the proper rate via spindle motor control 76; voice coil 49a must move the head arm assembly 30 between load ramp 47 and medium 21; and read-write control circuit 80 provides location data about the head arm assembly 30. That is, disk drive servo systems typically use embedded position feedback in their voice coil motor servo loop. Hence, the read-write heads read servo sectors magnetically embedded in the medium surface. The servo sectors provide position information to the drive so that a track location on the medium can be determined.

During head loading from a load ramp, such as load ramp 47, before the heads have reached the medium surface no positioning information is available. Accordingly, the position of the heads along the ramp cannot be determined without an additional sensor. Once the heads are loaded onto the medium, the heads will emit a signal indicative of the signals on the medium surface such as servo sector information. Hence, the heads are monitored during loading for a signal from the medium surface to indicate that the heads have loaded.

In the exemplary disk drive 10 as described herein, during head loading, head arm assembly 30 must overcome the friction of load ramp 47 before moving into position on medium 21. To that end, the spring that biases the load ramp arms 60a, 60b apart, as well as the friction of load beams 44 against the ramp 47 surface, must be overcome (see FIGS. 3 and 4). To overcome the friction and bias, a high current must be applied to voice coil motor 49a. The downside to applying a high current is that heads 46 could move off of load ramp 47 too fast and thereby damage the surface of medium 21. Moreover, where, as here, power consumption should minimized, the peak power consumed during head loading will be high. A process for dealing with the velocity of the head loading and the peak power is described below.

Figure 6A:
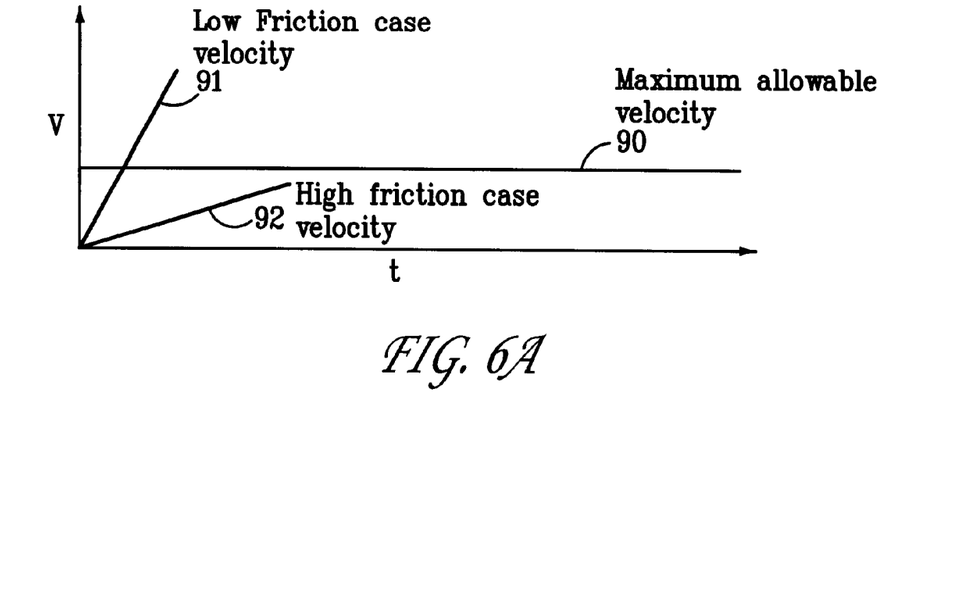
FIG. 6A is a graph of head velocity for a constant power head load.

The problem of heads 46 loading too fast from load ramp 47 is illustrated by the graph of FIG. 6A. That graph illustrates head loading where a constant current is applied to voice coil motor 49a during loading. By contrast, the problems associated with the heads loading too fast are mitigated by applying a varying current during the head loading procedure. An exemplary current varying head load is illustrate by the graph of FIG. 6B. Both FIGS. 6A and 6B graph the velocity of heads 46 as they load onto medium 21 after an electrical signal is applied to voice coil motor 49a. Both figures plot velocity (V) along the ordinate and plot time (t) along the abscissa.

FIG. 6A shows two velocity curves 91, 92 for disk drives wherein a constant voice coil motor current is applied. Level 90 represents the maximum allowable velocity for head 46. That is, if head velocity exceeds level 90, then heads 46 will likely damage medium 21. Curve 91 present a worst case drive in which the load ramps present very little friction. In such a case, the heads accelerate off of the load ramps and exceed the maximum velocity level. On the other hand, in a drive with very high friction, as represented by curve 92, the head accelerate slowly and don't exceed maximum velocity level 90 before loading on the medium. Unfortunately, for some disk drive designs, such as drive 10, the head loading friction may vary between the friction represented by curve 91 and the friction represented by curve 92. As a result, applying a constant head loading voltage to voice coil motor 49a will result in damage to some drives.

Figure 6B:
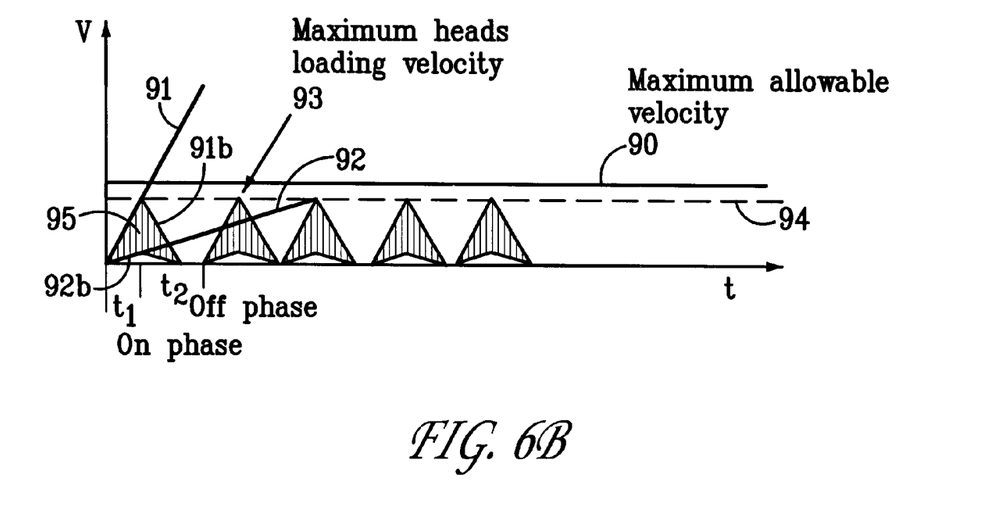
FIG. 6B is a graph of head velocity for a pulsed power head load.

FIG. 6B superimposes a pulsed voice coil motor current on the curves of FIG. 6A. Here, a burst of current is applied to voice coil motor 49a for a time t1. Thereafter, the voltage to voice coil motor 49a is turned off for a period t2. The result is that curve 91 approaches yet never reaches level 90 during the power burst. Instead, curve 91 reaches an acceptable velocity level 94 when voice coil motor 49a is turned off and heads 46 decelerate along curve 91b. After period t2, current is again applied to voice coil motor 49a and the process is repeated. For each pulse of power supplied to voice coil motor 49a, heads 46 are nudged closer to medium 21 without exceeding the maximum velocity level. Accordingly, for the low friction case 91, the high friction case 92, and all cases in between (represented by the shaded area 95), heads 46 do not exceed the maximum velocity level.

Figure 7A:
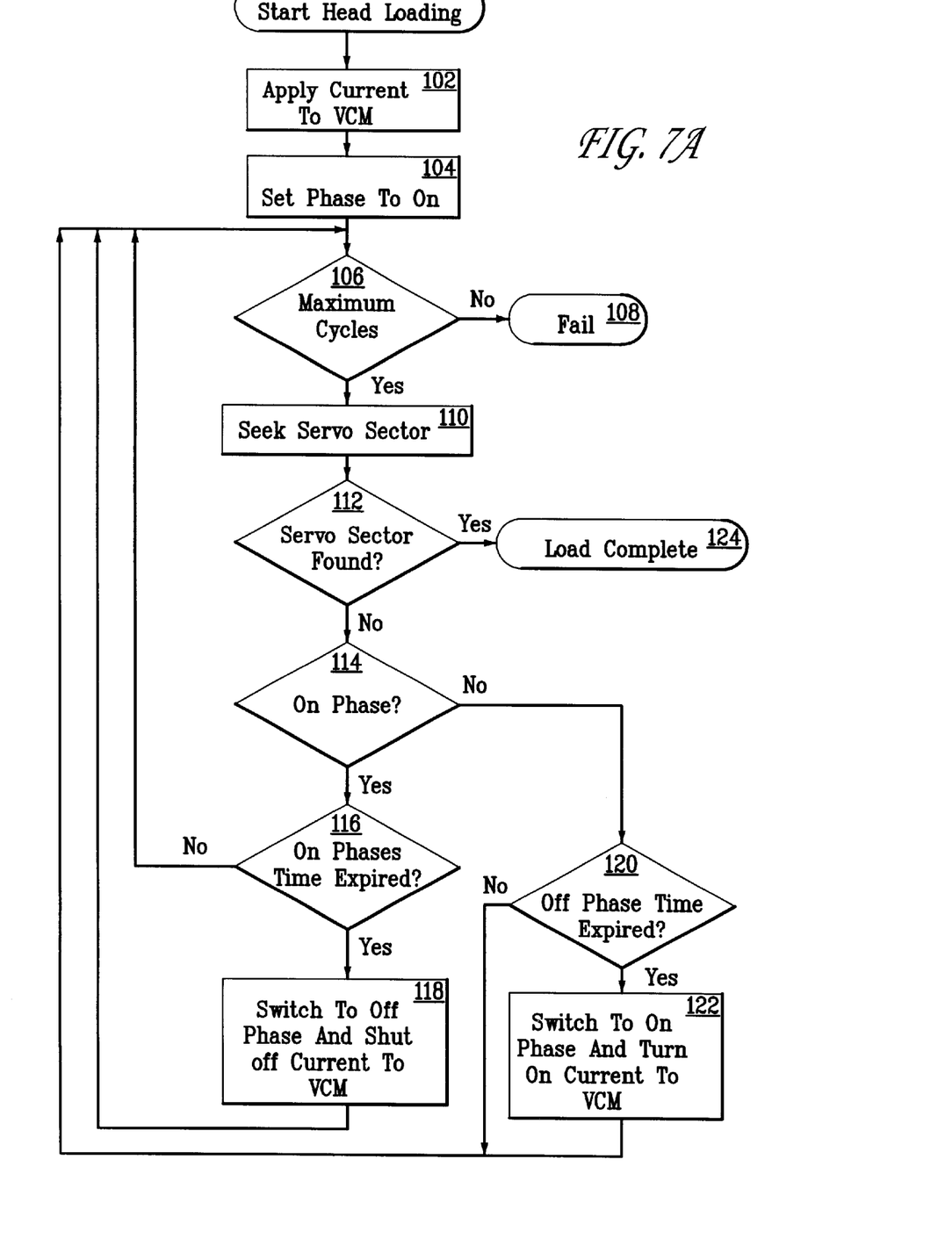
FIG. 7A is a flow chart of a process for loading the heads with a pulsed power to a voice coil motor.
Figure 7B:
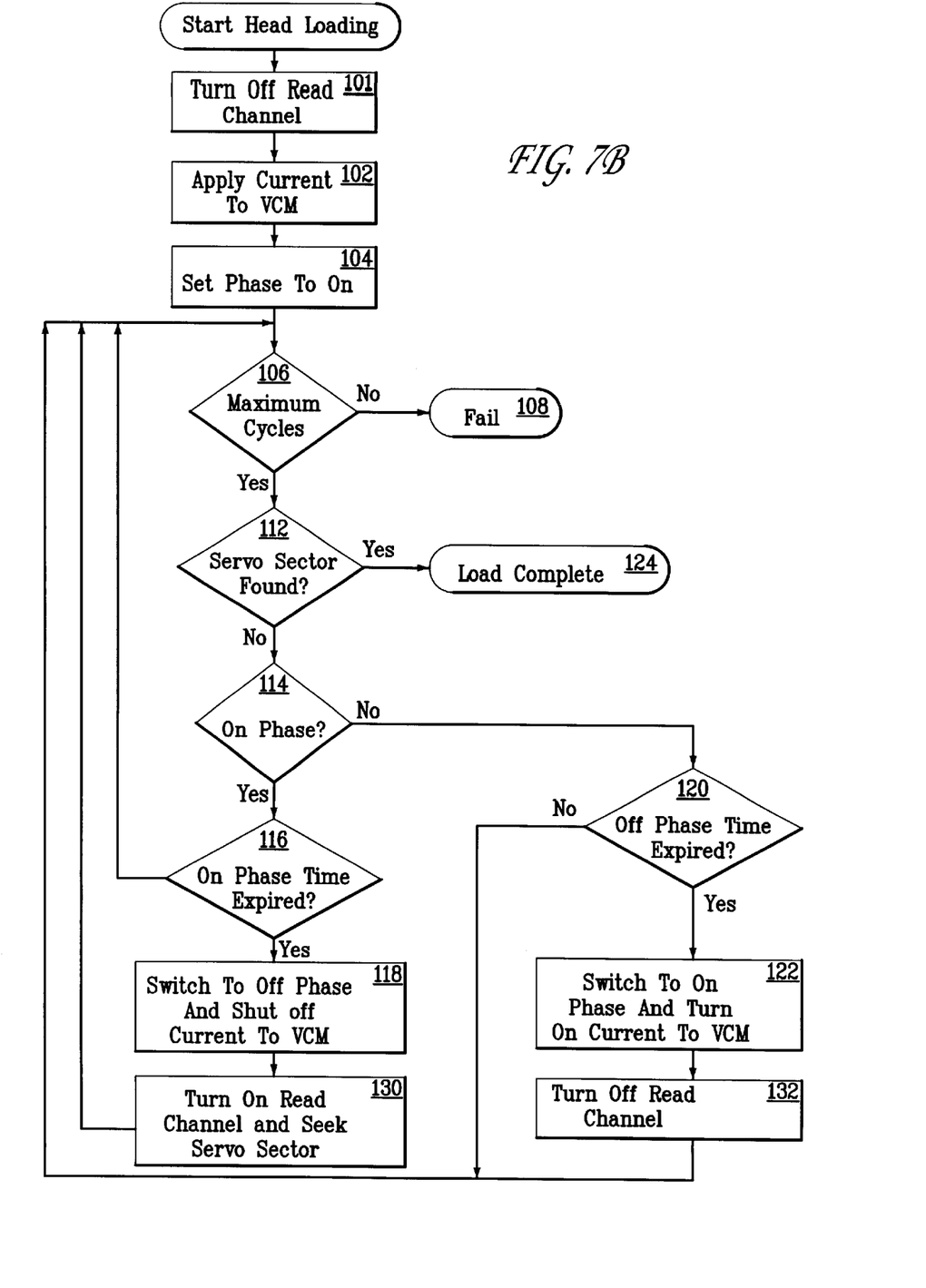
FIG. 7B is a flow chart of a process for loading the heads with a pulsed power to a voice coil motor.

FIGS. 7A and 7B provide flow charts of the head loading process as executed in CPU 70 of FIG. 5. Accordingly, throughout the description reference is made to both the mechanical aspects of drive 10 (as shown in FIGS. 1–4) and the electrical system aspects of drive 10 (as illustrated in the block diagram of FIG. 5). FIG. 7B differs from FIG. 7A in that it provides for a control over peak power usage during head loading and thus is more energy efficient.

Starting with FIG. 7A, the loading process begins when current is applied to voice coil motor 49*a* (VCM) (step 102). A software flag is then set indicating that voice coil motor 49*a* is powered on ("the on phase"). This corresponds to the time t1 in FIG. 6B. As a result, head arm assembly 30 nudges on load ramp 47 toward medium 21. Most likely, this first nudge will not be sufficient to move heads 46 onto the surface of medium 21, as a series of similar nudges are expected to complete the loading. After each nudge, check is made to see if the maximum number of nudge cycles has occurred (step 106). This check is a precaution to ensure that the drive does not continuously nudge heads 46 without them ever reaching medium 21. In such a case, a problem must have occurred in drive 10 and a failure is indicated (step 108).

In order to determine if heads 46 have landed on medium 21, heads 46 are read to determine if a signal from the surface of medium 21 is present. To that end, heads 46 attempt to acquire a servo sector (step 110). Of course, a servo sector would only be read if heads 46 were loaded on medium 21. Hence, if a servo sector is found (step 112), then heads 46 were successfully loaded onto medium 21 (step 124). On the other hand, if no servo sector was found then additional head nudges are required. However, if voice coil motor 49*a* is still in the on phase (step 114), and the phase time has not expired (step 116) then the current nudge is still in progress and the loop is repeated. If the current nudge is completed, then the on phase time will have expired (step 116), and drive 10 is switched to the off phase (corresponding to time t2 in FIG. 6B), and voice coil motor 49*a* is powered down (step 118) before repeating the next nudge.

Referring back to step 114, if drive 10 is not in the on phase mode (i.e., drive 10 is in off phase mode), then a check is made to determine if the off phase time has expired (step 120). If the off phase time has not expire, the flow chart loop is repeated. If the off phase time has expired, then drive 10 is switched back to on phase mode and voice coil motor 49*a* is again powered on (step 122).

When the process of FIG. 7A is completed, heads 46 will have been successfully nudged onto medium 21. As heads 46 move closer to medium 21 with each nudge, the final nudge will softly land heads 46 onto medium 21 without causing damage to either heads 46 or medium 21.

As noted above, the process charted in FIG. 7B is very similar to the process charted in FIG. 7A. Primarily, the process of FIG. 7B adds steps to the process to address peak power concerns. When installed in portable electronic devices, drive 10 may rely primarily on batteries to supply its power needs. Many small batteries, particularly those found in portable electronic devices, have limited peak power capacity. Moreover, drive 10 will experience maximum peak power usage when loading and parking heads 46. Those are also the times when voice coil motor 49*a* must overcome friction. Hence, the process of FIG. 7B addresses peak power concerns by powering down drive electronic components to reduce power usage and increase available power to voice coil motor 49*a*. For example, since heads 46 will not necessarily have to read or write data for the duration of the load and park processes (they are only needed to determine when heads 46 are on medium 21), portions of read-write head control circuitry 80 could be safely powered down. In particular, as can be seen in FIG. 8, the read-channel integrated circuit consumes about 1.5 to 2 watts when in Active mode. Thus, by powering down or changing the power state of the read-channel integrated circuit, the amount of peak power available to voice coil motor 49*a* can be increased.

As shown in FIG. 7B, the read channel is turned off before applying power to voice coil motor 49*a* and powered on when power is removed from voice coil motor 49*a* (see steps 101, 130, and 132). Of course, the read channel is turned temporarily turned back on so that heads 46 can check medium 21 for a servo sector (step 130). In other words (referring to the graph of FIG. 6B), the read channel is powered down during time t1 and powered on during time t2.

The above description of preferred embodiments is not intended to implied limit the scope of protection of the following claims. Thus, for example, except where they are expressly so limited, the following claims are not limited to applications involving the exemplary disk drive system shown and described herein.

What we claim is:

1. A disk drive device having a data storage medium, comprising:

a load beam having a read-write head coupled to a distal end of said load beam; said load beam movable between a first position off of said medium and a second position on said medium;

a data reading circuit in electrical communication with said read-write head for transferring data to and from said medium by way of said read-write head;

an actuator coupled to said load beam, for converting an electrical signal into mechanical movement of said load beam;

control means in electrical communication with said actuator, said control means providing the electrical signal to cause said head to move from said first position toward said second position; and control means for controlling the electrical power supplied to said data reading circuit such that electrical power supplied to said data reading circuit is reduced to a constant low power state for a predefined time during the provision of the electrical signal to said actuator; and wherein said electrical signal comprises at least two bursts of electrical power, wherein electrical power to said data reading circuit is reduced during bursts and restored between the bursts.

2. The disk drive device as recited in claim 1, wherein a portion of said data reading circuit is turned to a low power state during said bursts of electrical power.

3. The disk drive as recited in claim 2, wherein said data reading circuit comprises a read-channel circuit and wherein said portion of said data reading circuit that is turned to said low power state comprises said read-channel circuit.

4. The disk drive device as recited in claim 3 wherein said low power state comprises a no power state.

5. The disk drive device as recited in claim 1 wherein said actuator comprises a voice coil motor and wherein said electrical signal is applied to said voice coil motor.

6. The disk drive device as recited in claim 1 wherein said actuator comprises a rotary actuator.

7. The disk drive device as recited in claim 1 wherein said disk drive complies with a PCMCIA form factor.

8. The disk drive device as recited in claim 1 wherein said medium comprises a magnetic medium.

9. The disk drive device as recited in claim 8 wherein said medium comprises a floppy medium.

10. The disk drive device as recited in claim 1 wherein said medium comprises a removable medium.

11. The disk drive device as recited in claim 1 wherein said electrical power comprises a voltage.

12. The disk drive device as recited in claim 1 wherein said electrical power comprises an electrical current.

\* \* \* \* \*